(12) United States Patent
Tanaka et al.

(10) Patent No.: US 10,600,447 B2
(45) Date of Patent: Mar. 24, 2020

(54) INFORMATION PROCESSING APPARATUS AND METHOD, AND PROGRAM

(71) Applicant: Sony Corporation, Tokyo (JP)

(72) Inventors: Kazumasa Tanaka, Kanagawa (JP); Kenji Tanaka, Kanagawa (JP); Yukihiro Nakamura, Kanagawa (JP); Yoshihiro Takahashi, Kanagawa (JP); Kentaro Fukazawa, Tokyo (JP); Kyosuke Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 519 days.

(21) Appl. No.: 15/354,185

(22) Filed: Nov. 17, 2016

(65) Prior Publication Data

US 2017/0069352 A1 Mar. 9, 2017

Related U.S. Application Data

(63) Continuation of application No. 14/084,396, filed on Nov. 19, 2013, now Pat. No. 9,529,506.

(30) Foreign Application Priority Data

Nov. 26, 2012 (JP) ................................ 2012-257827

(51) Int. Cl.
| | | |
|---|---|---|
| G06F 3/0484 | (2013.01) | |
| G06F 3/0482 | (2013.01) | |
| G11B 27/13 | (2006.01) | |
| G06F 16/738 | (2019.01) | |
| G06K 9/00 | (2006.01) | |
| G11B 27/30 | (2006.01) | |
| G11B 27/34 | (2006.01) | |
| H04N 5/232 | (2006.01) | |

(52) U.S. Cl.
CPC ............ G11B 27/13 (2013.01); G06F 3/0484 (2013.01); G06F 16/738 (2019.01); G06K 9/00744 (2013.01); G11B 27/3081 (2013.01); G11B 27/34 (2013.01); H04N 5/23293 (2013.01); H04N 5/23296 (2013.01)

(58) Field of Classification Search
CPC ............................ G06F 11/1064; G06F 16/58
See application file for complete search history.

(56) References Cited

U.S. PATENT DOCUMENTS

| | | | |
|---|---|---|---|
| 2004/0263476 A1 | 12/2004 | Lim | |
| 2005/0044489 A1* | 2/2005 | Yamagami | G11B 27/034 715/243 |
| 2005/0068581 A1* | 3/2005 | Hull | G06F 3/1206 358/1.16 |
| 2007/0107015 A1* | 5/2007 | Kazama | G06F 3/04815 725/58 |
| 2007/0237225 A1* | 10/2007 | Luo | G06K 9/00711 375/240.12 |

(Continued)

*Primary Examiner* — Rayeez R Chowdhury
(74) *Attorney, Agent, or Firm* — Haug Partners LLP; William S. Frommer

(57) ABSTRACT

An information processing apparatus including a plurality of feature amount extraction parts which extract, from content, a plurality of feature amounts that contain information concerning a camera motion in a frame of the content. A display control part displays frames of the content and a GUI on the displayed content frame. The GUI corresponds to an operation concerning the camera motion on the basis of the extracted camera motion information.

20 Claims, 15 Drawing Sheets

(56) References Cited

U.S. PATENT DOCUMENTS

| | | | |
|---|---|---|---|
| 2007/0266322 A1* | 11/2007 | Tretter | G11B 27/105 715/716 |
| 2008/0016472 A1 | 1/2008 | Rohlf | |
| 2009/0052783 A1* | 2/2009 | Aoki | G06K 9/00228 382/209 |
| 2009/0083814 A1* | 3/2009 | Sekine | G11B 27/105 725/104 |
| 2010/0135541 A1* | 6/2010 | Lai | G06K 9/00208 382/118 |
| 2010/0146392 A1* | 6/2010 | Duhig | G11B 27/034 715/719 |
| 2010/0165088 A1* | 7/2010 | Seo | A61B 1/0005 348/65 |
| 2010/0239225 A1* | 9/2010 | Nakama | H04N 5/783 386/343 |
| 2010/0262911 A1* | 10/2010 | Kaplan | G11B 27/034 715/719 |
| 2010/0277620 A1* | 11/2010 | Iijima | H04N 5/23232 348/240.1 |
| 2010/0302595 A1* | 12/2010 | Yamada | G06K 9/4642 358/1.18 |
| 2012/0282974 A1 | 11/2012 | Green | |

\* cited by examiner

FIG. 9
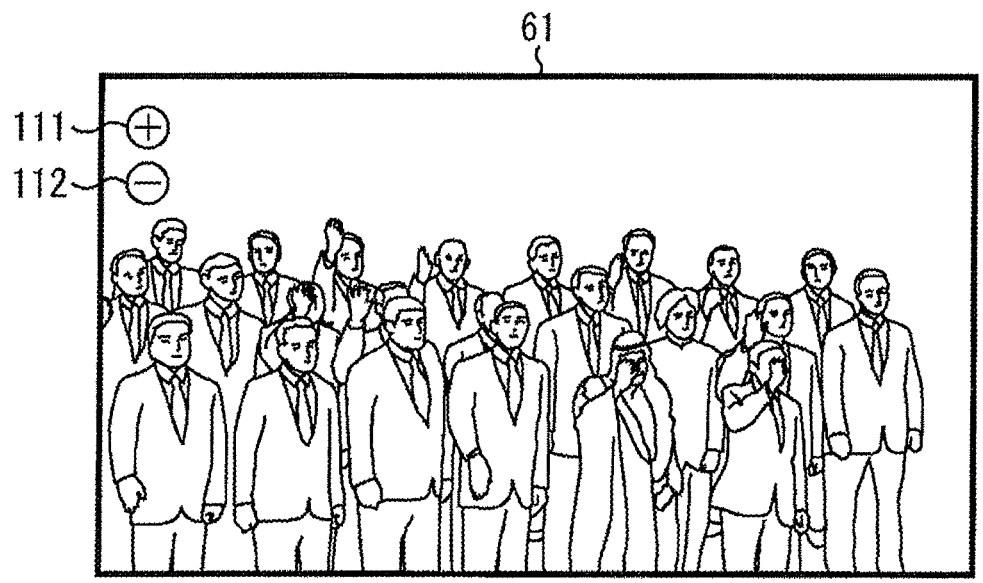
A
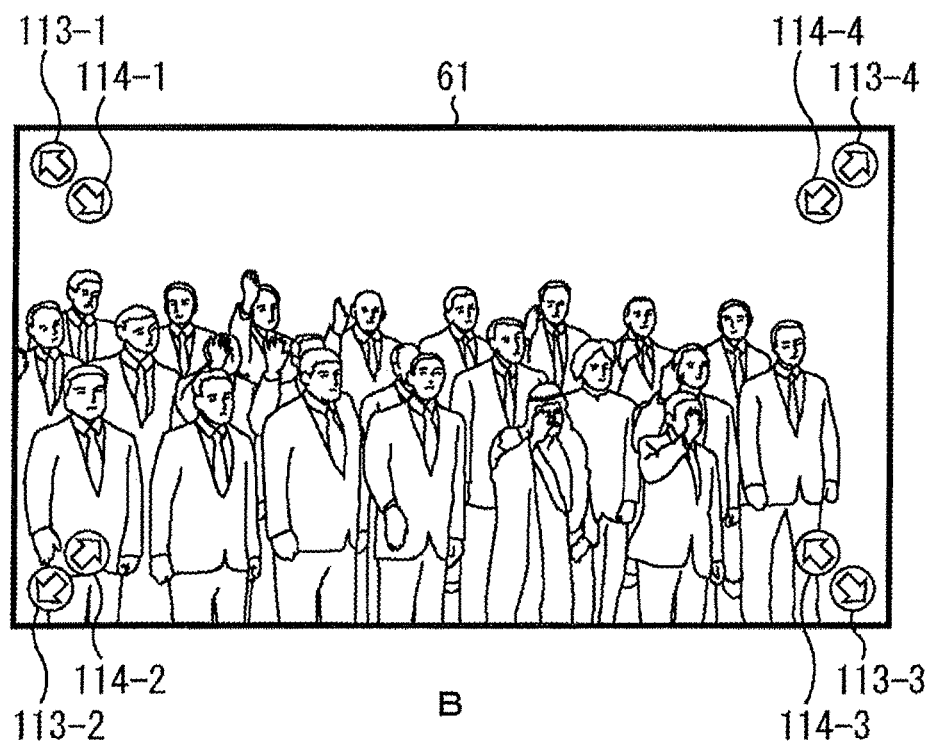
B

FIG. 11
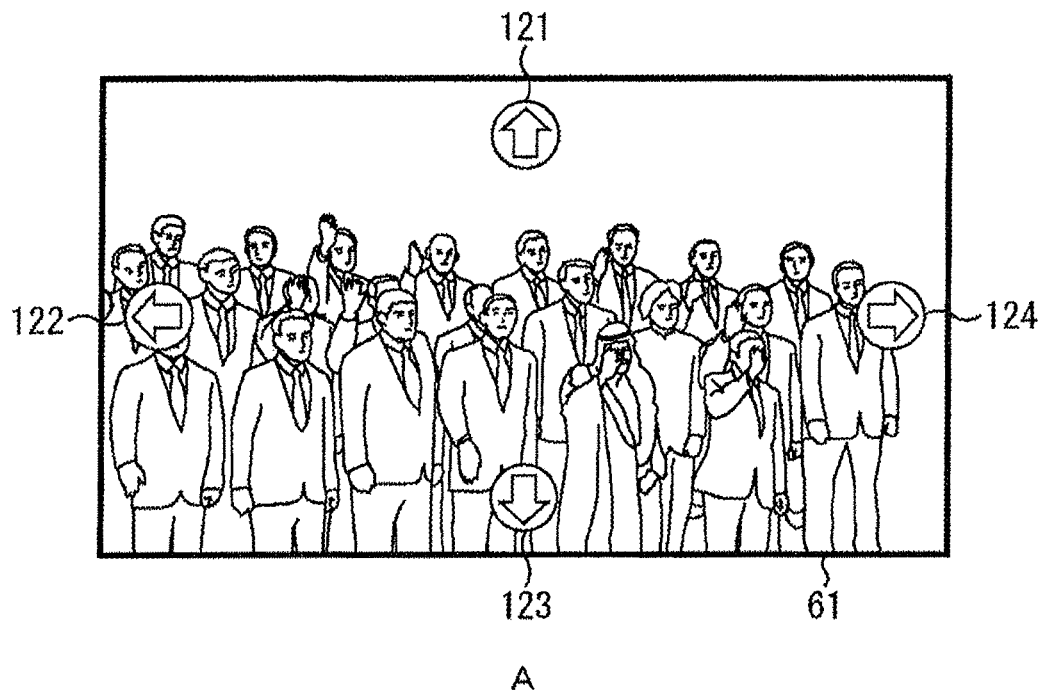
A
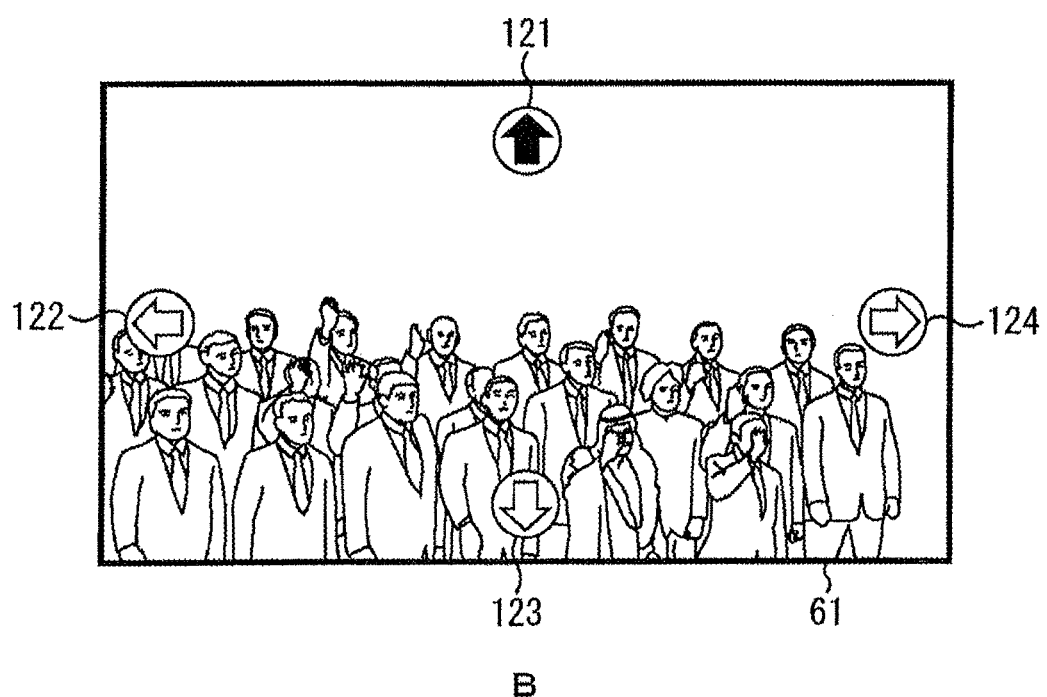
B

FIG. 13
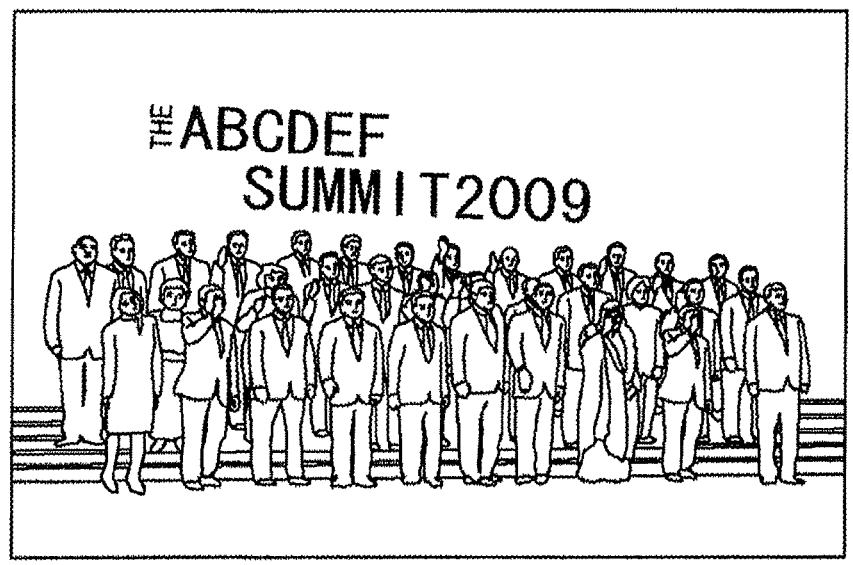
A
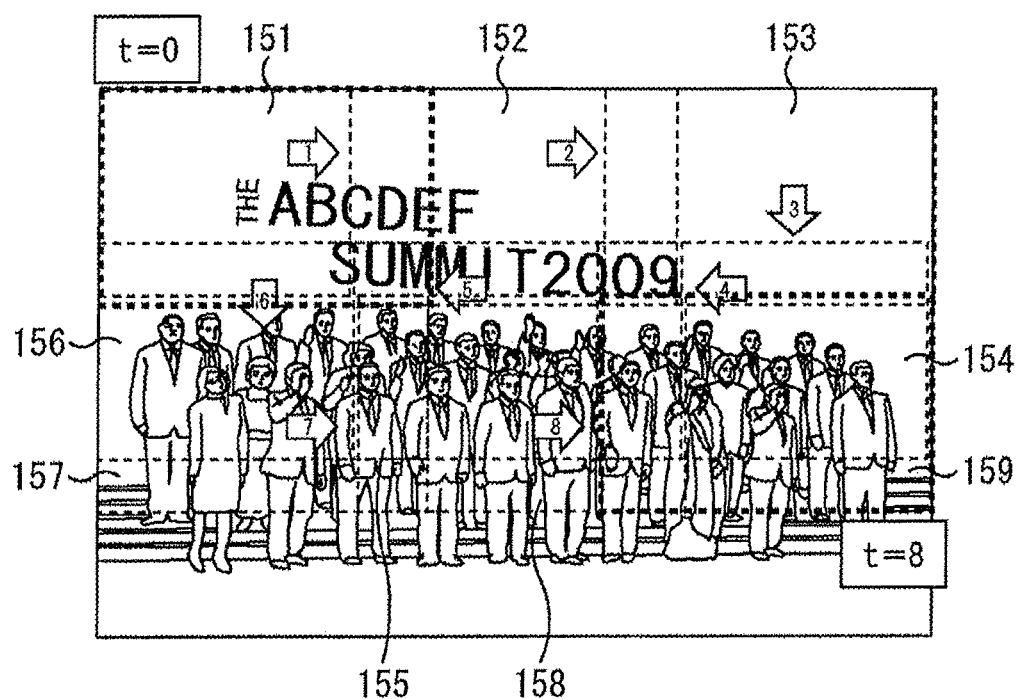
B

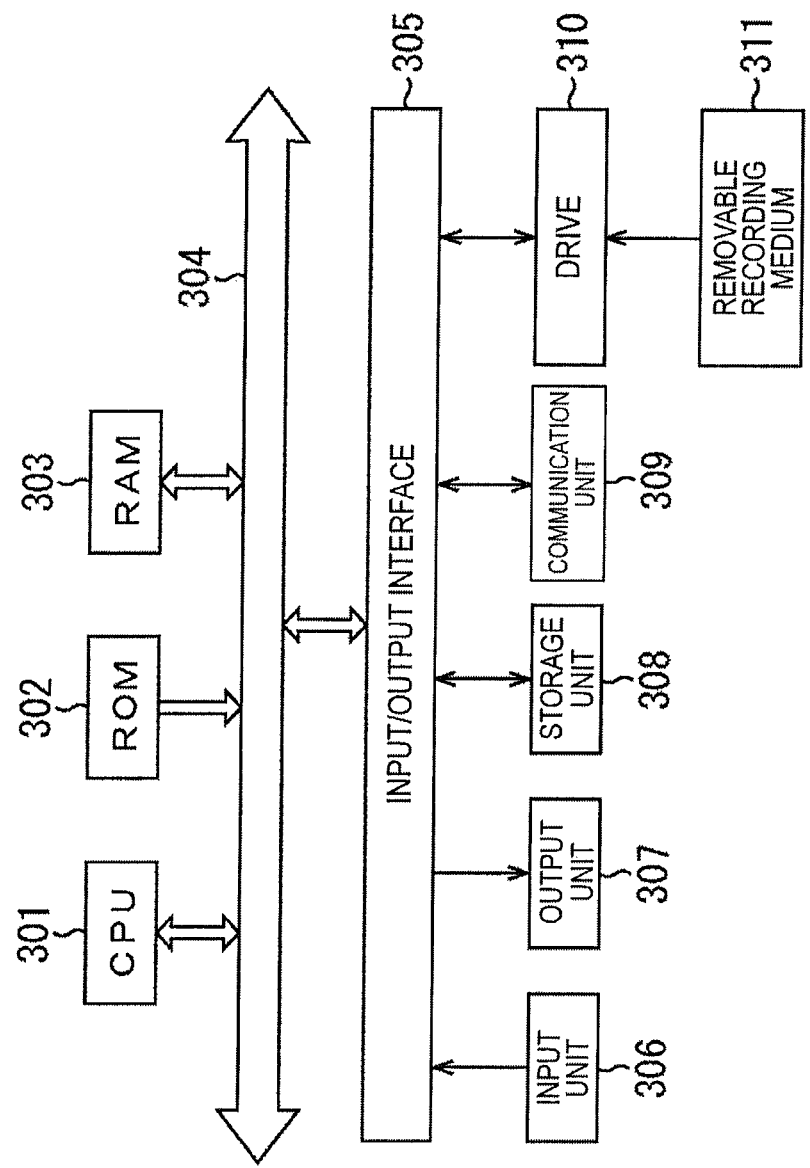

INFORMATION PROCESSING APPARATUS AND METHOD, AND PROGRAM

CROSS REFERENCE TO RELATED APPLICATIONS

This is a continuation of application Ser. No. 14/084,396, filed Nov. 19, 2013, which claims priority under 35 USC 119 to Japanese Application No. 2012-257827, filed in Japan Nov. 26, 2012, the entirety of which is incorporated herein by reference.

BACKGROUND

The present disclosure relates to an information processing apparatus and method, and program, and particularly relates to an information processing apparatus and method, and program which can improve operability for grasping a substance of content.

There has been a technology in which a video sequence is indexed by dividing segments into segments with a camera being moved and segments with a camera being fixed as a related art as is described in National Publication of International Patent Application No. 2005-538584 that applies a result of recognizing a camera motion in order to check a substance of a moving picture content.

In addition, there has been a technology in which an index image is generated for each type of camera motion as is described in Japanese Patent Laid-Open No. 6-276467.

These technologies enable the substance of the moving picture content to be grasped by displaying the camera motion along a time line or the like on a preview screen for checking the moving picture content for a certain duration.

SUMMARY

However, there has not been proposed a technology in which a user may use the camera motion to operate a preview of the content in the preview screen.

The present disclosure is made in consideration of such a situation, and improves operability for grasping a substance of content.

According to an embodiment of the present disclosure, there is provided an information processing apparatus including a plurality of feature amount extraction parts configured to extract, from content, a plurality of feature amounts containing information concerning a camera motion in a frame, and a display control part configured to display a GUI corresponding to an operation concerning the camera motion in the frame on the frame in the content on the basis of the information concerning the camera motion extracted by the feature amount extraction parts.

The information processing apparatus may further include a space recognition part configured to recognize a relationship in a space between frames using the information concerning the camera motion and an image feature amount of the plurality of feature amounts. The display control part may display the GUI corresponding to the operation concerning the camera motion in the frame on the frame in the content on the basis of the information concerning the camera motion extracted by the feature amount extraction parts and the relationship in the space between the frames recognized by the space recognition part.

The GUI corresponding to the operation concerning the camera motion may be a GUI enabling a camera angle to be switched to another angle.

The display control part may switch a display of the frame to a display of a frame of an angle corresponding to an operation on the GUI by a user.

The GUI corresponding to the operation concerning the camera motion may be a GUI enabling a zoom-in or zoom-out operation.

The display control part may switch a display of the frame to a display of a frame of zoom-in or zoom-out corresponding to an operation on the GUI by a user.

According to an embodiment of the present disclosure, there is provided an information processing method including extracting, by an information processing apparatus, from content, a plurality of feature amounts containing information concerning a camera motion in a frame, and displaying, by the information processing apparatus, a GUI corresponding to an operation concerning the camera motion in the frame on the frame in the content on the basis of the extracted information concerning the camera motion.

According to an embodiment of the present disclosure, there is provided a program causing a computer to function as a plurality of feature amount extraction parts configured to extract, from content, a plurality of feature amounts containing information concerning a camera motion in a frame, and a display control part configured to display a GUI corresponding to an operation concerning the camera motion in the frame on the frame in the content on the basis of the information concerning the camera motion extracted by the feature amount extraction parts.

According to one embodiment of the present disclosure, a plurality of feature amounts containing information concerning a camera motion for each frame are extracted from content. Then, a GUI corresponding to an operation concerning the camera motion for the frame is displayed on the frame in the content on the basis of the extracted information concerning the camera motion.

According to an embodiment of the present disclosure, operability for grasping a substance of content may be improved.

BRIEF DESCRIPTION OF THE DRAWINGS

FIG. 9 is a diagram showing an example of a preview display section in the case of FIG. 8;

FIG. 11 is a diagram showing an example of the preview display section in the case of FIG. 8;

FIG. 13 is a diagram showing an example of space recognition in the case of FIG. 12;

FIG. 15 is a block diagram showing a configuration example of a computer.

DETAILED DESCRIPTION OF THE EMBODIMENT(S)

Figure 1:
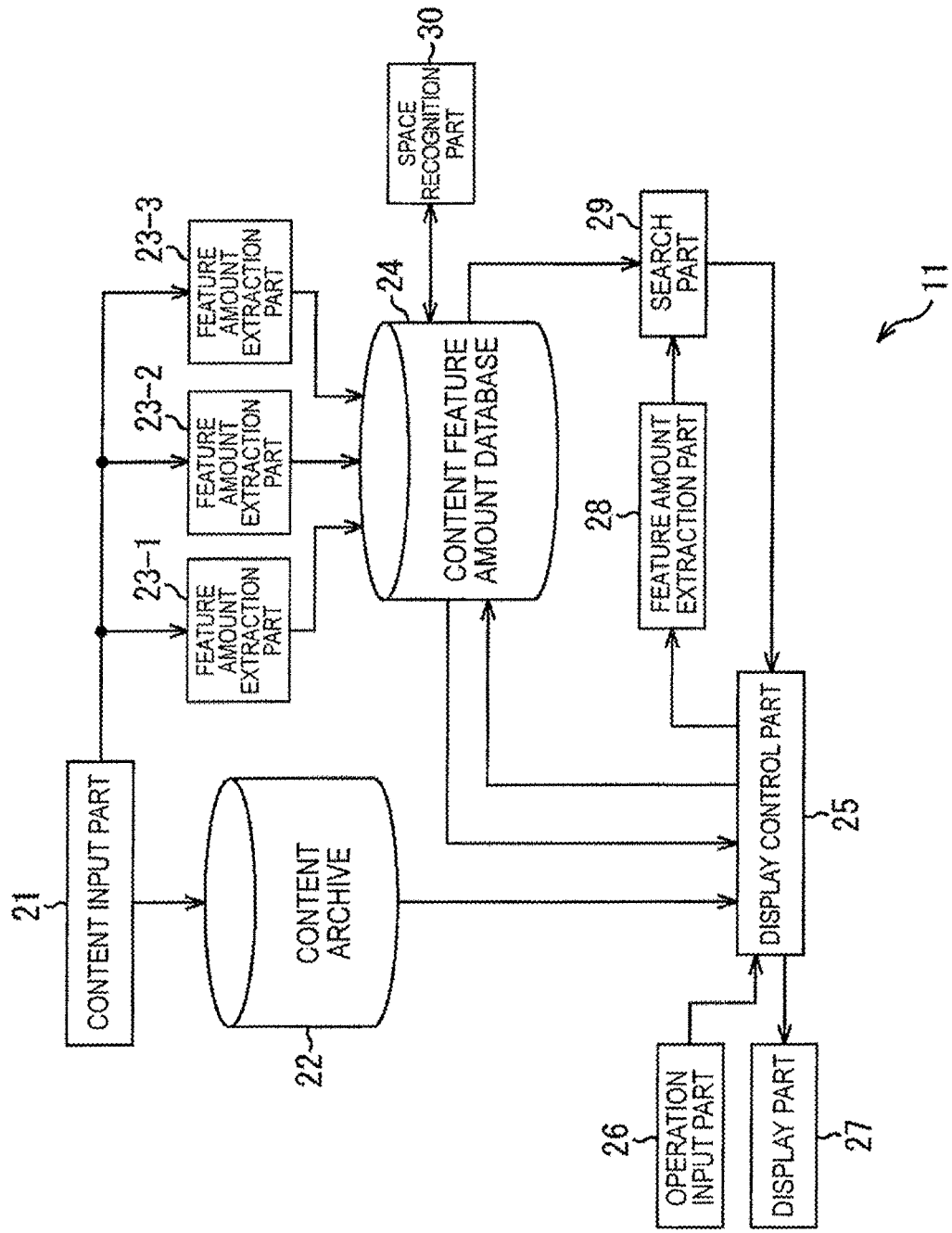
FIG. 1 is a diagram showing a configuration example of an information processing apparatus applying the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, a description will be given of an embodiment for carrying out the present disclosure (referred to as embodiment below). The description is given in the order as follows.

1. First embodiment (information processing apparatus)
2. Second embodiment (computer)

1. First Embodiment

[Information processing apparatus configuration of present technology]

FIG. 1 is a diagram showing a configuration example of an information processing apparatus applying the present technology, An information processing apparatus 11 shown in FIG. 1 displays feature amounts of content extracted from the content by way of a recognition technology such as image recognition, speech recognition, and character recognition in a screen for previewing content along a time line. Further, the information processing apparatus 11, in the case of pausing the content being previewed, displays on the paused frame (image) a GUI corresponding to an operation concerning the camera motion for the frame. The information processing apparatus 11 is constituted by a personal computer, for example.

In an example of FIG. 1, the information processing apparatus 11 is configured to include a content input part 21, content archive 22, feature amount extraction parts 23-1 to 23-3, content feature amount database 24, display control part 25, operation input part 26, display part 27, feature amount extraction part 28, search part 29, and space recognition part 30.

The content input part 21 receives content from the outside not shown or the like and supplies the received content to the feature amount extraction parts 23-1 to 23-3. Additionally, the content input part 21 registers the received content in the content archive 22.

The content archive 22 has the content registered therein from the content input part 21.

The feature amount extraction parts 23-1 to 23-3 perform the image recognition, speech recognition, character recognition and the like on the content to extract each of a plurality of feature amounts including an image feature amount, speech feature amount and the like. For example, the feature amount extraction part 23-3 extracts particularly information concerning the camera motion (hereafter, referred to as camera motion information) as one of the feature amounts from the content. The camera motion information includes information of camera's motion such as pan and tilt, and information of lens's motion of the camera such as zoom-in and zoom-out. As the camera motion information, information of a sensor sensing the camera motion in shooting the content or the like can be also used.

The feature amount extraction parts 23-1 to 23-3 register the extracted feature amount of the content in the content feature amount database 24. Here, the feature amount extraction parts 23-1 to 23-3 include three feature amount extraction parts, but, the number thereof is not limited to three and varies depending on a type (number) of the extracted feature amounts. Hereinafter, the feature amount extraction parts 23-1 to 23-3, when not necessary to be distinguished from each other, are merely referred to as the feature amount extraction part 23.

The content feature amount database 24 has the feature amount of the content extracted by the feature amount extraction part 23 registered therein.

The display control part 25 retrieves, in response to a user instruction from the operation input part 26, content to be previewed and a feature amount of the content from the content archive 22 and the content feature amount database 24, respectively. The display control part 25 generates a preview screen on the basis of a preview image of the retrieved content and the information concerning the feature amount of the content, and controls the display part 27 to display the generated preview screen. In displaying the preview screen, the display control part 25, at a time when supplying text or image information input via the operation input part 26 for which an instruction is issued by the user to the feature amount extraction part 28, receives a search result supplied in response thereto from the search part 29, The display control part 25 displays the preview screen on the basis of the search result.

Further, the display control part 25, in displaying the preview screen when a moving picture being preview-reproduced is paused by a user operation on the operation input part 26, determines whether or not it is possible to move a viewpoint or angle of the camera from the paused image (frame) (that is, operation concerning the camera motion) on the basis of the camera motion information and space information of the content feature amount database 24. If the viewpoint or angle of the camera can be moved from the paused image, the display control part 25 displays the GUI (Graphical User Interface) to be superimposed on the image, the GUI corresponding to the operation concerning the camera motion and including a button for enabling the movement (operation) of the viewpoint or angle of the camera and the like. In the case where the button is pushed by the user operation on the operation input part 26, the display control part 25 switches the display to an image of different angle corresponding to the pushed button, and moves a line indicating a reproducing position in the time line to a position of the switched image.

Further, the display control part 25, in displaying the preview screen, performs modification, update and the like on the information registered on the content feature amount database 24 on the basis of correction for the feature amount input via the operation input part 26 and the like.

The operation input part 26 includes a mouse, a touch panel laminated on the display part 27, and the like, for example. The operation input part 26 supplies a signal in response to the user operation to the display control part 25. The display part 27 displays the preview screen generated by the display control part 25.

The feature amount extraction part 28 extracts the feature amount of the text or image information that is supplied from the display control part 25 and the user issues an instruction for, and supplies the feature amount to the search part 29. The search part 29 searches the content feature amount database 24 for a feature amount similar to the feature amount from the feature amount extraction part 28 and supplies the search result to the display control part 25.

The space recognition part 30 recognizes identity of an object in a video from the camera motion information, image feature amount and the like of the feature amounts of the contents registered in the content feature amount database 24 to recognize space information of a space in the video, space identity and the like. For example, recognized is the space information such as a positional relationship and magnitude (enlargement and reduction) relationship in a space between frames. The space recognition part 30 registers the recognized space information in the content feature amount database 24.

Operation of Information Processing Apparatus

Figure 2:
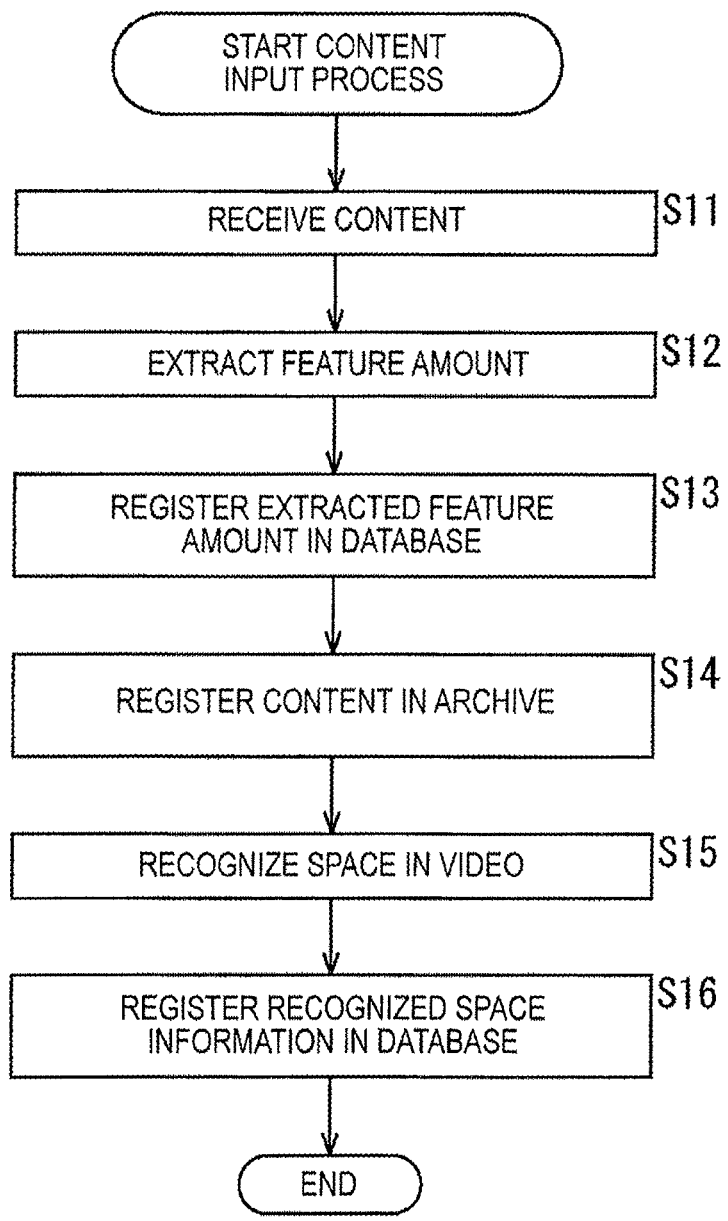
FIG. 2 is flowchart illustrating a content input process of the information processing apparatus.

Subsequently, a description will be given of a content input process of the information processing apparatus 11 with reference to a flowchart in FIG. 2.

At step S11, the content input part 21 receives content from the outside not shown or the like. The content input part 21 supplies the received content to the feature amount extraction parts 23-1 to 23-3.

At step S12, the feature amount extraction parts 23-1 to 23-3 perform the image recognition, speech recognition, character recognition and the like on the content from the content input part 21 to extract each of the feature amounts including the image feature amount, speech feature amount and the like. Here, at step S12, the camera motion information is also extracted. At step S13, the feature amount extraction parts 23-1 to 23-3 register the extracted feature amount of the content in the content feature amount database 24.

At step S14, the content input part 21 registers the received content in the content archive 22.

At step S15, the space recognition part 30 recognizes identity of an object in a video from the camera motion information, image feature amount and the like of the feature amounts of the contents registered in the content feature amount database 24 to recognize a space in the video.

At step S16, the space recognition part 30 registers the recognized space information in the content feature amount database 24.

A description will be given of a preview display process of the content which is carried out by use of the content and content feature amount registered as described above, with reference to a flowchart in FIG. 3.

The user operates the operation input part 26 to select content to be previewed. The information of the content selected by the user is supplied via the operation input part 26 to the display control part 25.

At step S31, the display control part 25 selects the content according to the information from the operation input part 26. At step S32, the display control part 25 acquires the content selected at step S31 from the content archive 22.

At step S33, the display control part 25 acquires the feature amount of the content selected at step S31 from the content feature amount database 24.

At step S34, the display control part 25 displays a preview screen. In other word, the display control part 25 generates the preview screen in which the information concerning the various feature amounts are displayed along the time line on the basis of the acquired content and the acquired content feature amount. The display control part 25 controls the display part 27 to display the generated preview screen (preview screen 51 shown in FIG. 5 described later). Here, displayed along the time line is not only feature amount information but also information concerning the feature amount. The information concerning the feature amount includes the feature amount information, information obtained by use of the feature amount, or the result retrieved by use of the feature amount.

At step S35, the display control part 25 determines whether or not an instruction for preview reproduction is issued on the basis of an operation signal from the operation input part 26. If determined at step S35 that the instruction for the preview reproduction is issued, the display control part 25 carries out the preview reproduction process at step S36. This preview reproduction process is described later with reference to FIG. 4, and in a process at step S35, an image corresponding to the operation on the content is displayed on the preview screen (preview screen 51 shown FIG. in 5 described later), a line indicating a reproducing position in the time line is moved to a position of the displayed image and displayed. The operation on the content includes an operation for carrying out preview reproduction, pause, fast-forward, and fast-rewind, for example.

If determined at step S35 that the instruction for the preview reproduction is not issued, step S36 is skipped and the process proceeds to step S37. At step S37, the display control part 25 determines whether or not to end display of the preview screen. If the user issues an instruction for the end via the operation input part 26, at step S37, it is determined to end the preview screen and the display of the preview screen ends.

On the other hand, at step S37, if it is determined not to end the display of the preview screen, the process returns to step S35 and step S35 and the subsequent steps are repeated.

Subsequently, a description will be given of a preview screen reproduction process at step S36 in FIG. 3 with reference to a flowchart in FIG. 4.

At step S51, the display control part 25 carries out preview reproduction. This allows the reproduced moving picture to be displayed in the preview display section 61 described later in FIG. 5.

At step S52, the display control part 25 changes the reproducing position display in the time line to a position of the image being reproduced. In other words, a line indicating the reproducing position in the time line is moved to the position of the image being reproduced.

At step S53, the display control part 25 determines whether or not an instruction for pause is issued on the basis of an operation signal from the operation input part 26. If determined at step S53 that the instruction for the pause is issued, the process proceeds to step S54.

The display control part 25, at step S54, pauses the moving picture being reproduced. Then, at step S55, if the viewpoint or angle of the camera can be moved from the paused image, the display control part 25 displays the GUI such as a button for enabling the movement (operation) of the viewpoint or angle of the camera on the basis of the camera motion information and the space information of the content feature amount database 24.

At step S56, the display control part 25 determines whether or not the camera angle is operated by the user on the basis of an operation signal from the operation input part 26. At step S56, if the button is depressed by the user operation on the operation input part 26, the camera angle is determined to be operated by the user, and the process proceeds to step S57. At step S57, the display control part 25 switches the display to an image of different angle corresponding to the operated button.

Then, the display control part 25, at step S58, changes the reproducing position display in the time line to a position of the display-switched image. In other words, a line indicating the reproducing position in the time line is moved to the position of the display-switched image, and the process proceeds to step S62.

On the other hand, if determined at step S53 that the instruction for the pause is not issued, the process proceeds to step S59. At step S59, the display control part 25 determines whether or not another operation (e.g., fast-rewind or fast-forward) is made by the user on the basis of an operation signal from the operation input part 26. If determined at step S59 that another operation is made by the user, the process proceeds to step S60.

The display control part 25, at step S60, carries out a reproduction process corresponding to the operation. For example; if an instruction for fast-forward is issued, the operation of fast-forward for the preview image or the like is made. Then, at step S61, the display control part 25 changes the reproducing position display in the time line to a position of the image being displayed. In other words, a line indicating the reproducing position in the time line (reproducing position display) is moved to the position of the image being displayed, and the process proceeds to step S62.

If determined at step S59 that another operation is not made, the process proceeds to step S62.

At step S62, the display control part 25 determines whether or not the content is reproduced to the end. If determined at step S62 that the content is reproduced to the end, the preview reproduction process ends. On the other hand, if determined at step S62 that the content is not reproduced to the end, the process returns to step S51 and step S51 and the subsequent steps are repeated.

Example of Preview Screen

Figure 5:
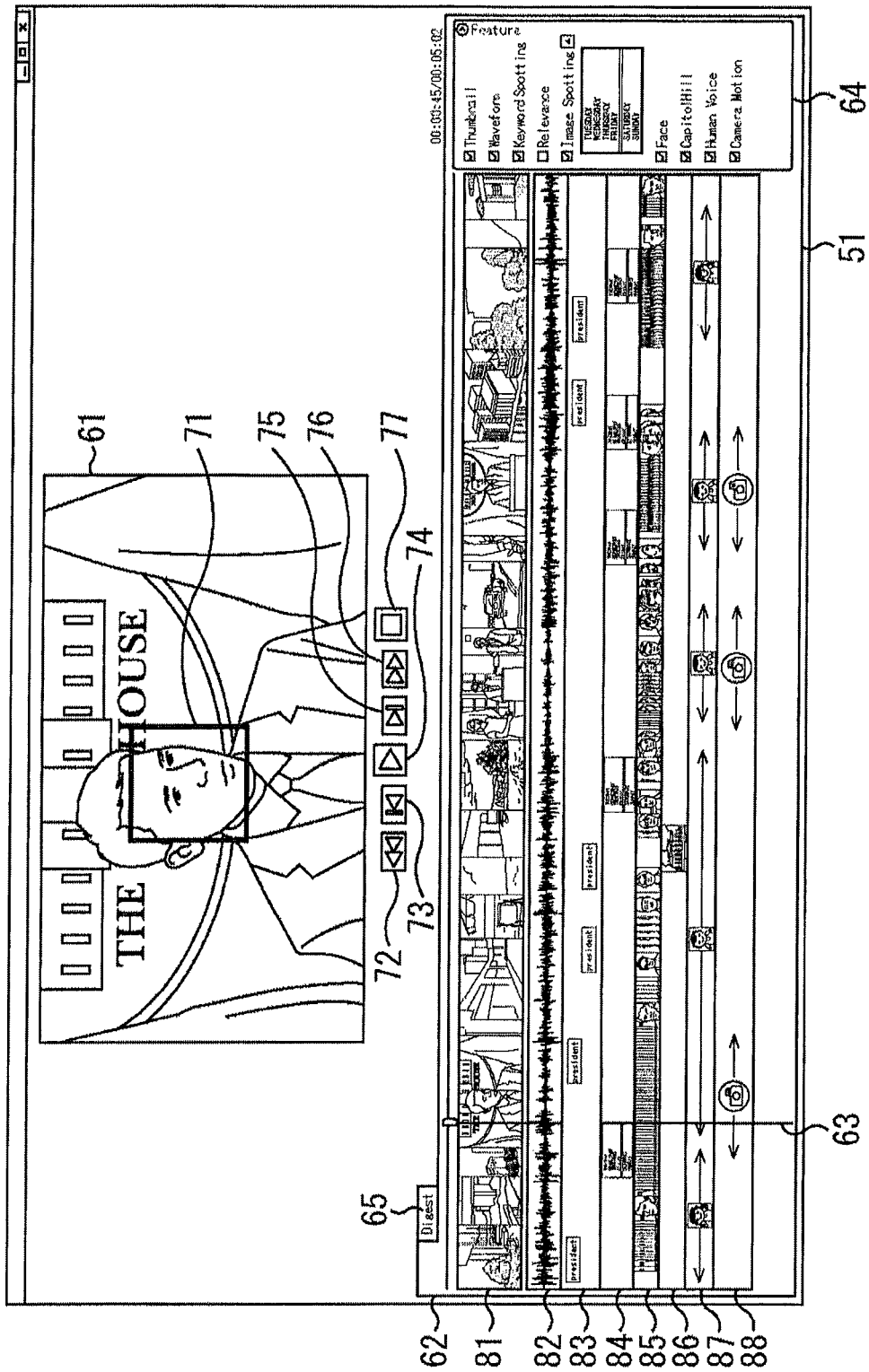
FIG. 5 is a diagram showing an example of a preview screen.

FIG. 5 shows an example of the preview screen.

Figure 3:
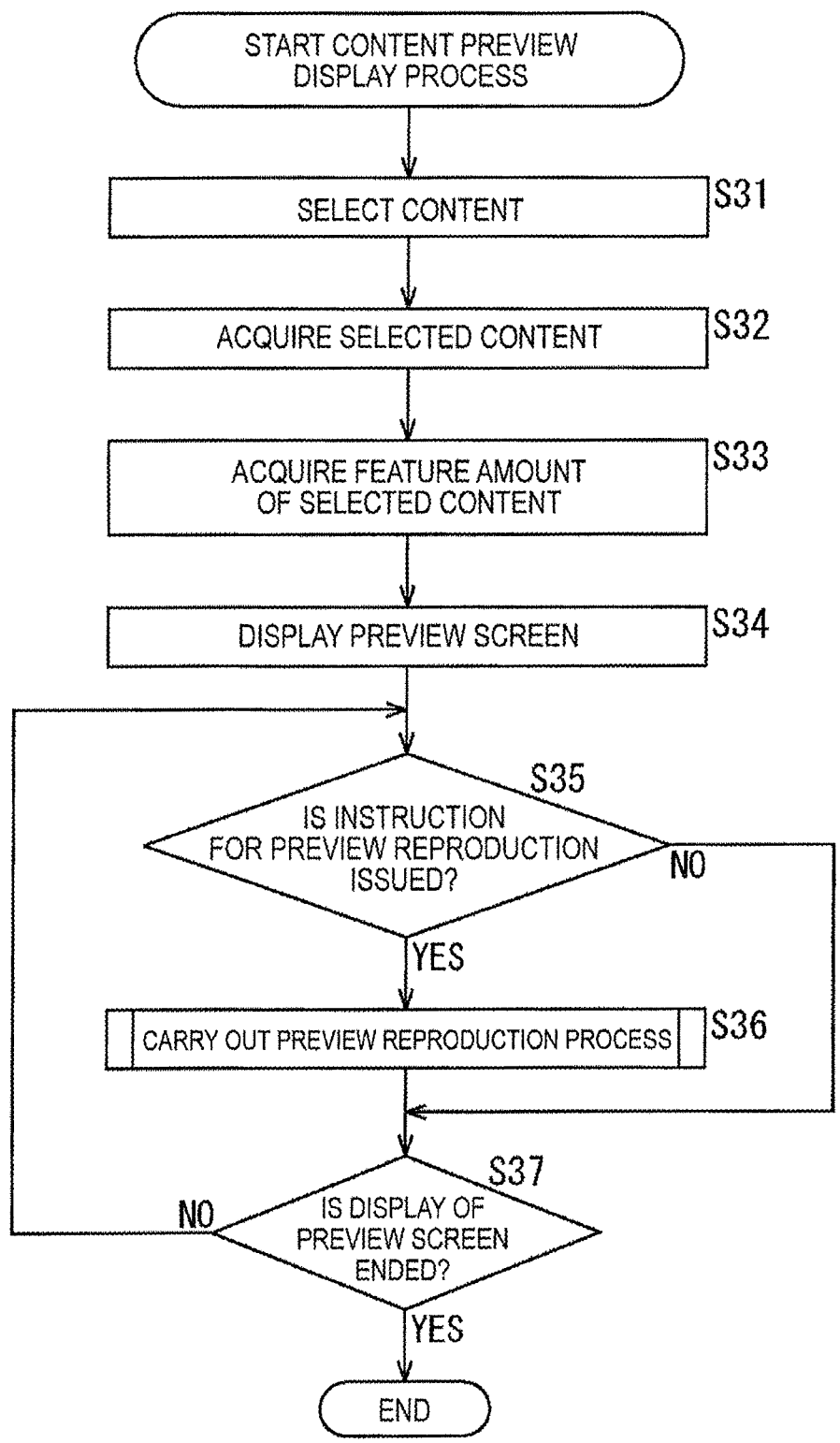
FIG. 3 is a flowchart illustrating a preview display process.
Figure 4:
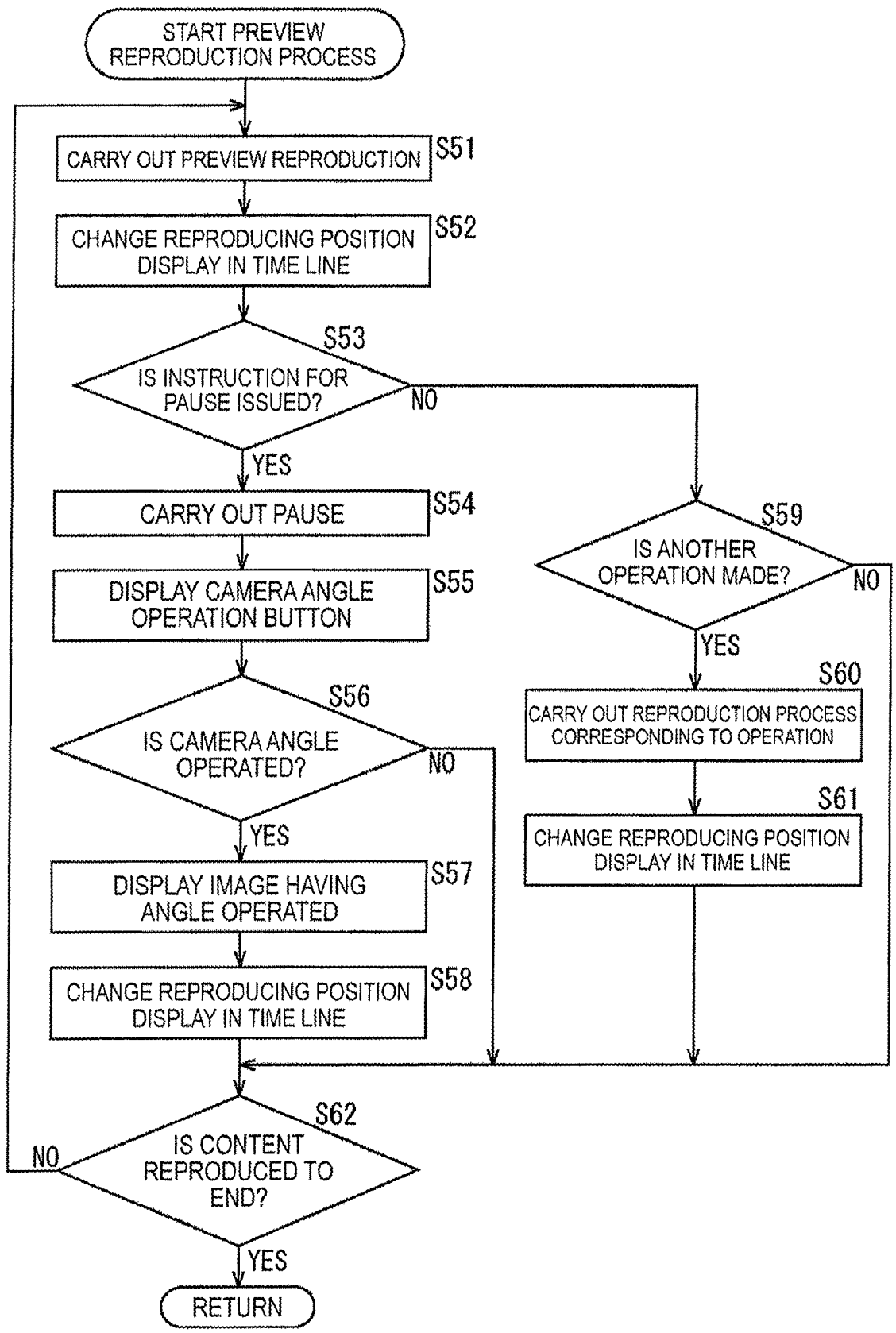
FIG. 4 is a flowchart illustrating a preview reproduction process.

An example in FIG. 5 shows the preview screen 51 described at step S34 in FIG. 3 or the like, for example.

The preview screen 51 includes the preview display section 61 in which a moving picture of the content can be previewed, and a time line display section 62 which is located lower than the preview display section 61 and displayed by selecting a upper left tab.

The preview display section 61, in response to the user operation on an operation button provided immediately below the preview display section 61, reproduces and previews the moving picture of the content. The operation button includes a fast-rewind button 72, skip-to-start button 73, reproduction button 74, skip-to-end button 75, fast-forward button 76, and stop button 77. Here, the reproduction button 74 is a reproduction button while reproduction of the moving picture of the content is stopped, but becomes a pause button while the moving picture of the content is being reproduced. The preview display section 61 displays a box 71 for selecting a face in the displayed content which undergoes a facial recognition in a face image display section 85 described later.

The time line display section 62 displays the information concerning a plurality of feature amounts extracted by the feature amount extraction parts 23-1 to 23-3 in FIG. 1 along the time line. Moreover, a line 63 indicating a reproducing position of an image (frame) currently displayed in the preview display section 61 is provided on the time line, and the user can grasp the reproducing position of the content on the time line by getting a look at the line 63. A display position of this line 63 is changed in response to the image displayed in the preview display section 61.

Further, displayed on the right side of the time line display section 62 is a feature amount list 64 which enables selection of display or non-display on the time line display section 62. The user can check or uncheck a box arranged on the left side of the feature amount list 64 to select the display or non-display of the information concerning the feature amount and display only information concerning the desired feature amount.

Note that, in the example in FIG. 5, only the fourth top box "Relevance" in the feature amount list 64 is unchecked. That is, the time line display section 62 in FIG. 5 does not display an importance display section which is to be displayed by checking "Relevance".

Further, a digest generating display section 65 is actually provided which is for generating a digest moving picture and the like at the same position as the time line display section 62, but not shown in the example in FIG. 5. By selecting a tab provided upper left of those, the digest generating display section 65 can be displayed in place of the time line display section 62.

The time line display section 62 includes a scene change image display section 81, speech waveform display section 82, text search result display section 83, image search result display section 84, face image display section 85, object image display section 86, human speech region display section 87, and camera motion information display section 88 in this, order from the top. Any of them is a display section for displaying the information concerning the feature amount.

The scene change image display section 81 is displayed in the time line display section 62 by checking "Thumbnail" in the feature amount list 64. In the scene change image display section 81, a thumbnail image of a head frame image for each scene found by scene change is displayed on the time line as one of the feature amounts. Note that a scene head image is referred to as a scene change image below.

The speech waveform display section 82 is displayed in the time line display section 62 by checking "Wave form" in the feature amount list 64. In the speech waveform display section 82, a speech waveform of the content is displayed on the time line as one of the feature amounts.

The text search result display section 83 is displayed in the time line display section 62 by checking "Keyword Spotting" in the feature amount list 64. In the text search result display section 83, displayed is a result of searching the content feature amount database 24 for the text ("president" in case of the example in FIG. 5) the user inputs by operating the operation input part 26 on the basis of the feature amounts from the speech recognition or character recognition.

The image search result display section 84 is displayed in the time line display section 62 by checking "Image Spotting" in the feature amount list 64. In the image search result display section 84, displayed is (a thumbnail image of) a result of searching the content feature amount database 24 for a scene similar to the image the user selects by operating the operation input part 26 on the basis of the feature amount from the image recognition.

The face image display section 85 is displayed in the time line display section 62 by checking "Face" in the feature amount list 64. In the face image display section 85, displayed is, from content feature amount database 24, (a thumbnail image of) a feature amount similar to the feature amount from facial recognition which is obtained by recognizing a face selected by the box 71 in the preview display section 61.

The object image display section 86 is displayed in the time line display section 62 by checking "Capitol Hill" in the feature amount list 64. Here, in the example in FIG. 5, "Capitol Hill" is an example of an object, but an object is not limited to "Capitol Hill" and can be designated by the user. In the object image display section 86, displayed is (a thumbnail image of) a result of searching the content feature amount database 24 on the basis of the feature amount from recognition of an object (Capitol Hill in case of FIG. 5) designated by the user.

Note that the example is shown in which the face image and the object image are separately displayed, but the face is one of the objects. The image displayed in the face image display section 85 and the object image display section 86 may be an image (thumbnail image) obtained by trimming an extraction object from an original image.

The human speech region display section 87 is displayed in the time line display section 62 by checking "Human Voice" in the feature amount list 64. In the human speech region display section 87, displayed is a human speech region, music region or the like found by the feature amount from the speech recognition. Here, the human speech region display section 87 may display, as shown in FIG. 5, not only a region in which a human speeches but also a mark according to a sex or age of the human of speech.

The camera motion information display section 88 is displayed in the time line display section 62 by checking "Camera Motion" in the feature amount list 64. In the camera motion information display section 88, displayed is a region having the camera motion information such as pan, tilt, zoom-in, zoom-out or the like which is the feature amount from the camera motion recognition.

In the preview screen 51, various feature amounts, such as the feature amounts described above as the examples, which can be extracted from the content and the information obtained using the feature amounts are displayed along the time line.

Here, in the present technology, the GUI using particularly the camera motion information is displayed in the preview display section 61 in the preview screen 51 described above with reference to FIG. 5, and the operation on the screen enables operations of the camera angle and zoom-in/zoom-out for the video. A description thereof will be given specifically below.

Example of Camera Motion Information (Pan)

Figure 6:
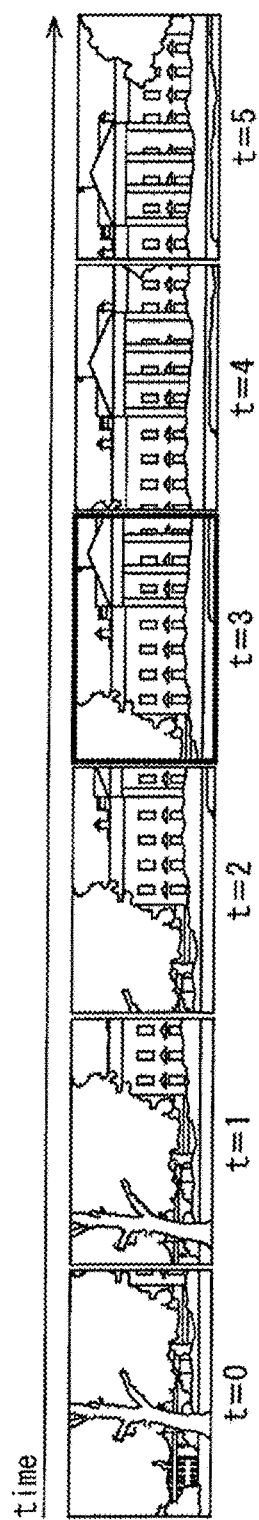
FIG. 6 is a diagram showing an example of a scene with a camera being panned rightward.

FIG. 6 is a diagram showing an example of a scene with a camera being panned rightward from t=0 to t=5.

For example, in the case where reproduction is started from an image at t=0 and paused at a timing of t=3, the space recognition part 30 can recognize that a space extends on the right and left of the image at t=3 owing to the camera motion information that the camera is panned rightward from t=0 to t=5.

Figure 7:
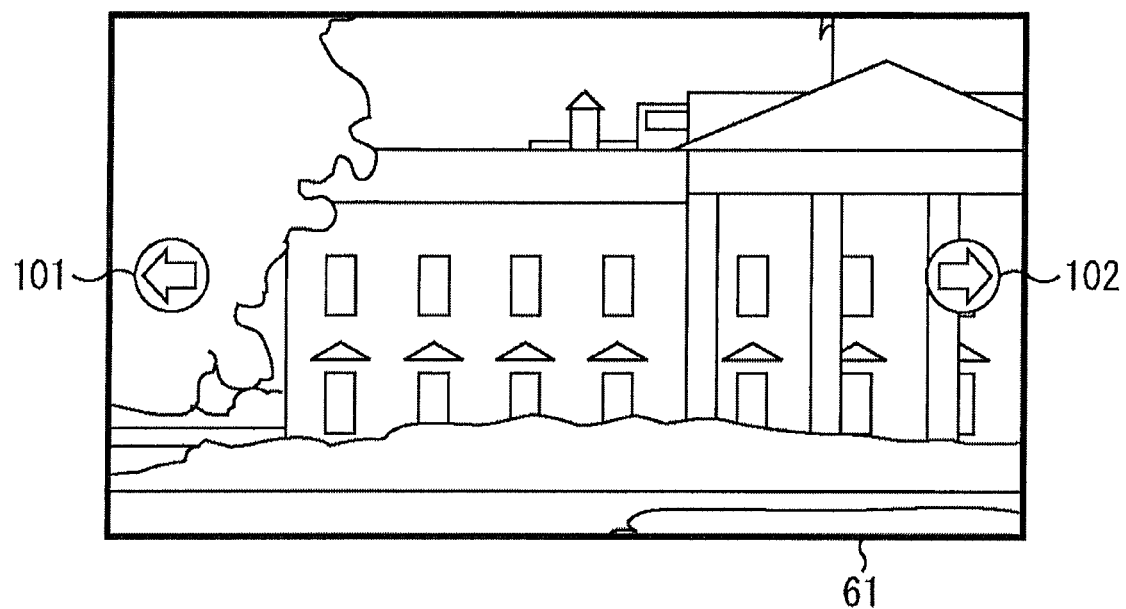
FIG. 7 is a diagram showing an example of a preview display section in the case of FIG. 6.

Therefore, the display control part 25, in the preview display section 61 paused at t=3, as shown in FIG. 7, superimposes a left arrow button 101 for panning leftward and a right arrow button 102 for panning rightward as the GUI on the image at t=3 in FIG. 6. On the other hand, the left arrow button 101 and the right arrow button 102 are the GUI enabling the camera angle to be switched to a different angle. Note that the GUI enabling the camera angle to be switched to a different angle is not limited to the right arrow button and left arrow button described above. Additionally, a shape of the GUI may not be necessarily a button.

When the user operates the operation input part 26 including a mouse and the like, for example, by clicking (depressing) the right arrow button 102, the camera angle is panned rightward to bring the reproducing position into t=4, and thus, the display in the preview display section 61 is switched from the image at t=3 to the image at t=4 in FIG. 6.

Alternatively, when the user operates the operation input part 26 to click (depress) the left arrow button 101, the camera angle is panned leftward to bring the reproducing position into t=2, and thus, the display in the preview display section 61 is switched from the image at t=3 to the image at t=2 in FIG. 6.

At this time, the similar operation can be made not only by clicking the button but also by directing the right and left directions using mouse operation such as a mouse gesture, and by directing the right and left directions using a finger gesture on the touch panel laminated on the display part 27.

Here, these arrow buttons can be displayed even during reproduction of the moving picture, and for example, in the case where the left arrow button 101 is clicked at the moment of t=3 during reproduction of the moving picture, reverse reproduction may be performed from the image at t=3 to the image at t=0.

Example of Camera Motion Information (Zoom)

Figure 8:
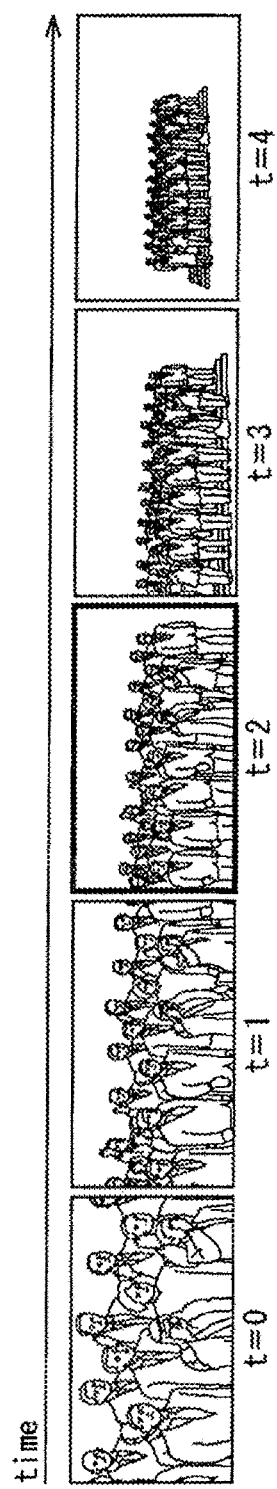
FIG. 8 is a diagram showing an example of a scene in which a camera zooms out.

FIG. 8 is a diagram showing an example of a scene in which a camera zooms out from t=0 to t=4.

For example, in the case where reproduction is started from the image at t=0 and paused at a timing of t=2, the space recognition part 30 can recognize that a space extends around the image at t=2 owing to the camera motion information that the camera zooms out from t=0 to t=4. Here, the camera zooms in in the reverse direction (from t=4 to t=0).

Therefore, the display control part 25, in the preview display section 61 paused at t=2, as shown in A of FIG. 9, superimposes a plus mark button 111 and a minus mark button 112 as the GUI on one portion on the image at t=2. On the other hand, the plus mark button 111 and the minus mark button 112 are the GUI enabling the zoom-in/zoom-out operation.

Alternatively, the display control part 25, in the preview display section 61 paused at t=2, as shown in B of FIG. 9, superimposes outward arrow buttons 113-1 to 113-4 and inward arrow buttons 114-1 to 114-4 as the GUI on the image at t=2 in four directions. On the other hand, the outward arrow buttons 113-1 to 113-4 and the inward arrow buttons 114-1 to 114-4 are also the GUI enabling the zoom-out/zoom-in operation. Here, the GUI enabling the zoom-out/zoom-in operation is not limited to the plus mark button, minus mark button, inward arrow button and outward arrow button described above. Additionally, a shape of the GUI may not be necessarily a button.

In the example in A of FIG. 9, when the plus mark button 111 is clicked, the screen is zoomed in to bring the reproducing position into t=1 and thus, the display in the preview display section 61 is switched from the image at t=2 to the image at t=1 in FIG. 8.

On the other hand, in the example in A of FIG. 9, when the minus mark button 112 is clicked, the screen is zoomed out to bring the reproducing position into t=3, and thus, the display of the preview display section 61 is switched from the image at t=2 to the image at t=3 in FIG. 8.

Further, in the example in B of FIG. 9, when any of the inward arrow buttons 114-1 to 114-4 is clicked, the screen is zoomed in to bring the reproducing position into t=1, and thus, the display of the preview display section 61 is switched from the image at t=2 to the image at t=1 in FIG. 8.

On the other hand, in the example in B of FIG. 9, when any of the outward arrow buttons 113-1 to 113-4 is clicked, the screen is zoomed out to bring the reproducing position into t=3, and thus, the display of the preview display section 61 is switched from the image at t=2 to the image at t=3 in FIG. 8.

At this time, as is the case of panning, the similar operation can be made not only by clicking the button but also by directing the direction of zoom-in or zoom-out using the mouse operation such as a mouse wheel. Moreover, the similar operation can be made by directing the direction of zoom-in or zoom-out using a finger gesture on the touch panel laminated on the display part 27.

Here, these arrow buttons can be displayed even during reproduction of the moving picture, and for example, in the case where the plus mark button 111 is clicked at the moment of t=2 during reproduction of the moving picture, reverse reproduction may be performed from the image at t=2 to the image at t=0.

Further, in the example in B of FIG. 9, when each of the arrow buttons is clicked, the enlargement or reduction can be made only in the direction of the clicked arrow button. For example, the outward arrow button 113-4 which is located at the upper right and points to the upper right direction is clicked, the image at t=3 in FIG. 8 is trimmed such that an image as shown in the FIG. 10 is displayed in the preview display section 61.

Figure 10:
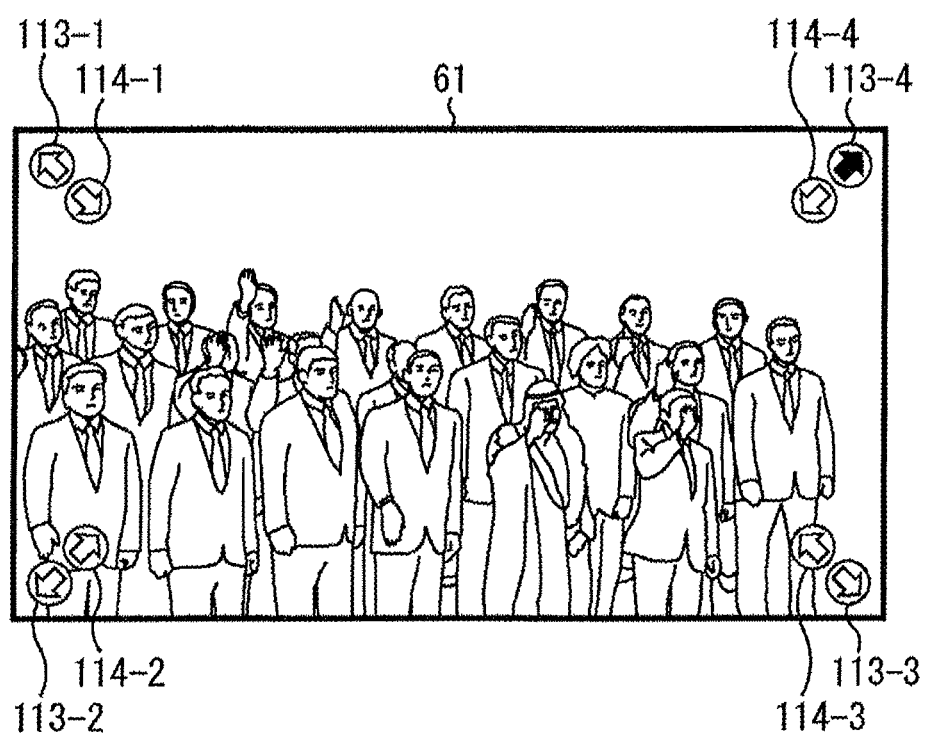
FIG. 10 is a diagram showing an example of the preview display section in the case of FIG. 8.

In other words, the image in FIG. 10 is an image obtained by enlarging the image at t=2 only in the upper right direction and is generated by trimming the image at t=3.

Note that in this case, the reproducing position is t=3, but is different from the usual reproducing position display since the image displayed in the preview display section 61 does not coincide with the actual image at t=3. Therefore, a marker indicating the reproducing position may be changed in color and displayed.

Similarly, the space recognition part 30 can recognize that a space in the vertical and horizontal directions of the image at t=2 also extend owing to the camera motion information that the camera zooms out from t=0 to t=4.

Therefore, the display control part 25 can also, as shown in A of FIG. 11, superimpose arrow buttons 121 to 124 for enabling a pan/tilt operation in the vertical and horizontal directions on the image in the preview display section 61.

When any of the arrow buttons 121 to 124 is clicked, the pan/tilt can be made in the direction of the clicked arrow button. Specifically, when the upward arrow button 121 is clicked, for example, the display control part 25 trims the image at t=3 in FIG. 8 to display an image as shown in B of FIG. 11 in the preview display section 61.

Note that in this case also, the reproducing position is t=3, but is different from the usual reproducing position display since the image displayed in the preview display section 61 does not coincide with the actual image at t=3. Therefore, the marker indicating the reproducing position may be changed in color and displayed.

Example of Camera Motion Information (Pan/Tilt Repetition)

Figure 12:
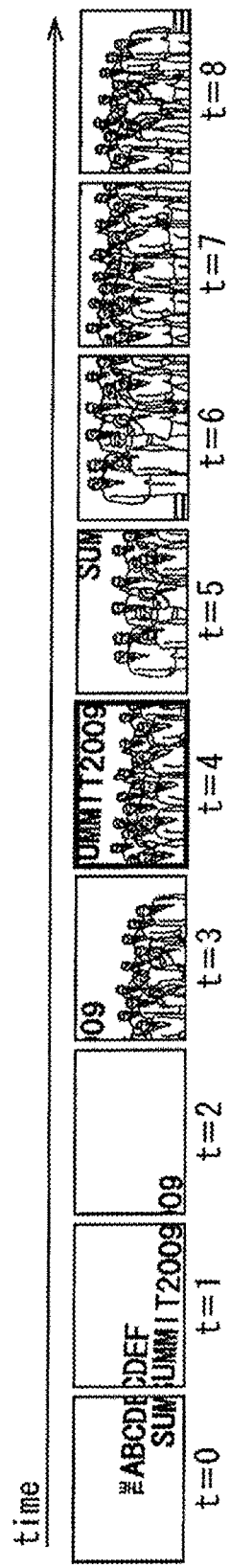
FIG. 12 is a diagram showing an example of a scene shot with repeated pan/tilt by a camera.

FIG. 12 is a diagram showing an example of a scene shot with repeated pan/tilt by a camera from t=0 to t=8.

In the case of a video in FIG. 12, the space recognition part 30 can recognize identity of an object in the video from for the camera motion information and image feature amount in the content feature amount database 24 to recognize that a space as shown in A of FIG. 13 can be reproduced. Moreover, at the same time, the space recognition part 30 can recognize that the camera was moved in numerical order of number of arrows shown in B of FIG. 13 to shoot images in FIG. 12.

In other words, the space recognition part 30 recognizes that images 151 to 159 in B of FIG. 13 correspond to the images from t=0 to t=8 in FIG. 12, respectively.

For example, in the case where reproduction is started from an image at t=0 and paused at a timing of t=4, the space recognition part 30 can recognize that a space extends around the image at t=4.

Figure 14:
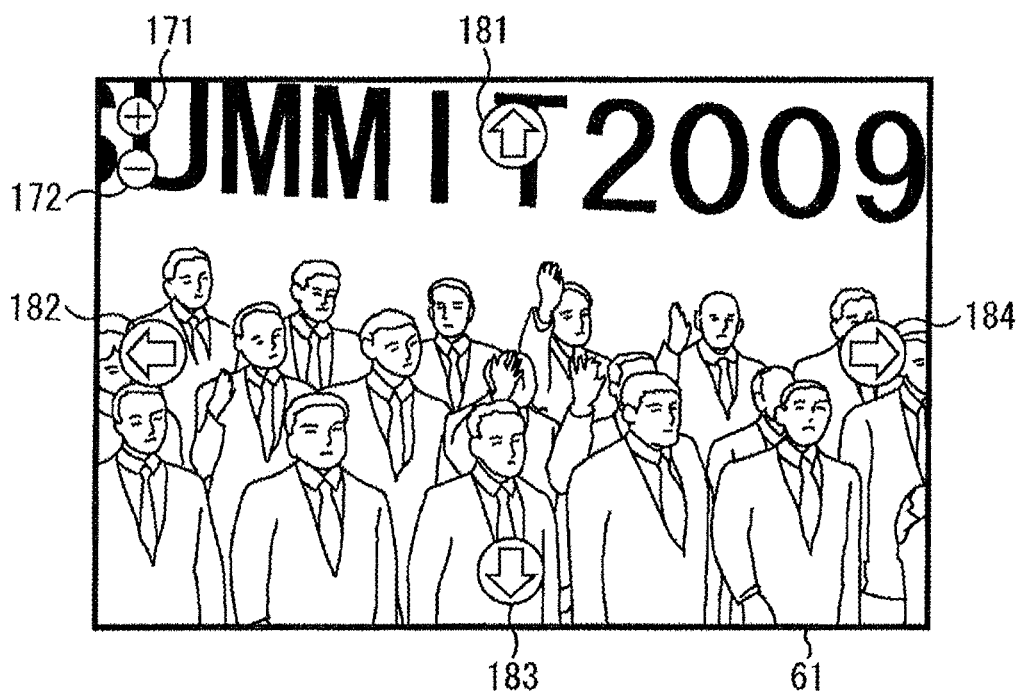
FIG. 14 is a diagram showing an example of a preview display section in the case of FIG. 12.

Therefore, the display control part 25, in the preview display section 61 paused at t=4, as shown in FIG. 14, superimposes a plus mark button 171 and minus mark button 172 for zoom-in and zoom-out as the GUI on the image at t=4. Further, the display control part 25, as shown in FIG. 14, superimposes arrow buttons 181 to 184 for pan/tilt in the vertical and horizontal directions as the GUI on the image at t=4 in the preview display section 61.

Note that the buttons for zoom-in and zoom-out may be the arrow buttons described above in B of FIG. 9.

Here, as for the pan in the right and left directions, the frames are continuous in the content. Accordingly, for example, when the leftward arrow button 182 is clicked, the camera angle is panned leftward to bring the reproducing position into t=3, and thus, the display in the preview display section 61 is switched from the image at t=4 to the image at t=3 in FIG. 12.

On the other hand, as for the tilt, and zoom-in or zoom-out in the up and down directions, the frames are not continuous in the content. Accordingly, for example, when the upward arrow button 181 is clicked, the display control part 25 trims away the image 152 which is an upper portion of the image at t=4 in FIG. 12 from the image with the space reproduced in B of FIG. 13 to be displayed in the preview display section 61.

In this case, the displayed image is an image reproduced from the image at t=4 and other images, and thus, the reproducing position display indicates a timing of the original material used for generating the reproduction image. That is, in case of reproducing from the image at t=4 and the image at t=1, the timings of t=4 and t=1 are indicated as the reproducing position. In this case, since the reproducing position is different from the usual reproducing position display, the marker indicating the reproducing position may be changed in color.

In this case, the similar operation can be made not only by clicking the button but also by directing the directions of pan/tilt and zoom-in or zoom-out using mouse operation such as a mouse gesture or mouse wheel. Moreover, the similar operation can be made by directing the direction of zoom-in or zoom-out using a finger gesture on the touch panel laminated on the display part 27.

Additionally, these buttons can be displayed even during reproduction of the moving picture, and for example, in the case where the left arrow button 182 is clicked at the moment of t=5 during reproduction of the moving picture, reverse reproduction may be performed from the image at t=5 to the image at t=3.

As described above, in the preview screen for checking a substance of content, the camera angle and zoom-in or zoom-out can be operated without regard to a reproducing timing or reproducing direction of the content in terms of the space extending in the preview image. Therefore, operability for grasping a substance of content can be improved.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed,

2. Second Embodiment (Computer)

Configuration Example of Computer

FIG. 15 illustrates a configuration example of hardware of a computer that executes the above series of processes by programs.

In a computer 300, a central processing unit (CPU) 301, a read only memory (ROM) 302 and a random access memory (RAM) 303 are mutually connected by a bus 304.

An input/output interface 305 is also connected to the bus 304. An input unit 306, an output unit 307, a storage unit 308, a communication unit 309, and a drive 310 are connected to the input/output interface 305.

The input unit 306 is configured from a keyboard, a mouse, a microphone or the like. The output unit 307 configured from a display, a speaker or the like. The storage unit 308 is configured from a hard disk, a non-volatile memory or the like. The communication unit 309 is configured from a network interface or the like. The drive 310 drives a removable recording medium 311 such as a magnetic disk, an optical disk, a magneto-optical disk, a semiconductor memory or the like.

In the computer configured as described above, the CPU 301 loads a program that is stored, for example, in the storage unit 308 onto the RAM 303 via the input/output interface 305 and the bus 304, and executes the program. Thus, the above-described series of processing is performed.

As one example, the program executed by the computer (the CPU 301) may be provided by being recorded on the removable recording medium 311 as a packaged medium or the like. The program can also be provided via a wired or wireless transfer medium, such as a local area network, the Internet, or a digital satellite broadcast.

In the computer, by loading the removable recording medium 311 into the drive 310, the program can be installed into the storage unit 308 via the input/output interface 305. It is also possible to receive the program from a wired or wireless transfer medium using the communication unit 309 and install the program into the storage unit 308. As another alternative, the program can be installed in advance into the ROM 302 or the storage unit 308.

It should be noted that the program executed by a computer may be a program that is processed in time series according to the sequence described in this specification or a program that is processed in parallel or at necessary timing such as upon calling.

In the present disclosure, steps of describing the above series of processes may include processing performed in time-series according to the description order and processing not processed in time-series but performed in parallel or individually.

The embodiment of the present disclosure is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present technology can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Further, an element described as a single device (or processing unit) above may be divided to be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the technology.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) An information processing apparatus including:
a plurality of feature amount extraction parts configured to extract, from content, a plurality of feature amounts containing information concerning a camera motion in a frame; and
a display control part configured to display a GUI corresponding to an operation concerning the camera motion in the frame on the frame in the content on the basis of the information concerning the camera motion extracted by the feature amount extraction parts.

(2) The information processing apparatus according to (1), further including:
a space recognition part configured to recognize a relationship in a space between frames using the information concerning the camera motion and an image feature amount of the plurality of feature amounts,
wherein the display control part displays the GUI corresponding to the operation concerning the camera motion in the frame on the frame in the content on the basis of the information concerning the camera motion extracted by the feature amount extraction parts and the relationship in the space between the frames recognized by the space recognition part.

(3) The information processing apparatus according to (1) or (2), wherein the GUI corresponding to the operation concerning the camera motion is a GUI enabling a camera angle to be switched to another angle.

(4) The information processing apparatus according to any one of (1) to (3), wherein the display control part switches a display of the frame to a display of a frame of an angle corresponding to an operation on the GUI by a user.

(5) The information processing apparatus according to (1) or (2), wherein the GUI corresponding to the operation concerning the camera motion is a GUI enabling a zoom-in or zoom-out operation.

(6) The information processing apparatus according to (1), (2), or (5), wherein the display control part switches a display of the frame to a display of a frame of zoom-in or zoom-out corresponding to an operation on the GUI by a user.

(7) An information processing method including:
extracting, by an information processing apparatus, from content, a plurality of feature amounts containing information concerning a camera motion in a frame; and
displaying, by the information processing apparatus, a GUI corresponding to an operation concerning the camera motion in the frame on the frame in the content on the basis of the extracted information concerning the camera motion.

(8) A program causing a computer to function as:
a plurality of feature amount extraction parts configured to extract, from content, a plurality of feature amounts containing information concerning a camera motion in a frame; and
a display control part configured to display a GUI corresponding to an operation concerning the camera motion in the frame on the frame in the content on the basis of the information concerning the camera motion extracted by the feature amount extraction parts.

What is claimed is:

1. An information processing apparatus comprising:
   at least one processor configured to
   recognize whether an object in one frame of stored image content of a moving picture shot in successive frames from a camera and viewable in one viewpoint obtained from one angle of the camera is substantially the same as an object in another of the successive frames of the stored image content of the moving picture viewable in another viewpoint shot from another angle of the same camera;
   notify a user, when viewing the object viewed in the one viewpoint, that the user is able to view the object from the viewpoint in the other frame of the successive frames if the object in the one frame is substantially the same as an object in the other frame; and
   cause an image reproduced from the other frame of the successive frames to be displayed when the user selects the other viewpoint for display if the user is notified that the other viewpoint is able to be viewed.

2. An information processing apparatus comprising:
   at least one processor configured to
   recognize a relationship in a space in an object in one frame of stored moving picture content shot in successive frames from a camera and viewable in one viewpoint of the stored moving picture content obtained from one zoom state of the camera and a space in an object in another of the successive frames of the stored moving picture content viewable in another viewpoint shot from another zoom state of the same camera;
   notify a user, when viewing the object viewed in the one viewpoint, that the user is able to view the object from the viewpoint in the other frame of the successive frames of the stored moving picture content if the relationship in the space permits the other viewpoint to be viewed; and
   cause an image reproduced from the other frame of the successive frames to be displayed when the user selects the other viewpoint for display if the user is notified that the other viewpoint is able to be viewed.

3. The information processing apparatus according to claim 1, wherein
   the at least one processor is configured to provide different notifications based on whether the object in the one frame is substantially the same as the object in the other frame.

4. The information processing apparatus according to claim 2, wherein
   the at least one processor is configured to provide different notifications based on the relationship.

5. The information processing apparatus according to claim 1, wherein
   the at least one processor is configured to control a display to notify the user.

6. The information processing apparatus according to claim 2, wherein
   the at least one processor is configured to control a display to notify the user.

7. The information processing apparatus according to claim 1, wherein
   the at least one processor is configured to provide different notifications based on user operation.

8. The information processing apparatus according to claim 2, wherein
   the at least one processor is configured to provide different notifications based on user operation.

9. The information processing apparatus according to claim 1, wherein
   the at least one processor is configured to control display of information for operation by the user.

10. The information processing apparatus according to claim 2, wherein
    the at least one processor is configured to control display of information for operation by the user.

11. The information processing apparatus according to claim 9, wherein
    the at least one processor is configured to display different information for operation by the user based on whether the object in the one frame is substantially the same as the object in the other frame.

12. The information processing apparatus according to claim 4, wherein
    the at least one processor is configured to display different information for operation by the user based on the relationship.

13. The information processing apparatus according to claim 1, wherein
    the user notification is a GUI corresponding to an operation concerning whether the object in the one frame is substantially the same as the object in the other frame.

14. The information processing apparatus according to claim 2, wherein
    the user notification is a GUI corresponding to an operation concerning the relationship.

15. The information processing apparatus according to claim 13, wherein
    the GUI is different based on whether the object in the one frame is substantially the same as the object in the other frame.

16. The information processing apparatus according to claim 14, wherein
the GUI is different based on the result of the relationship.

17. The information processing apparatus according to claim 13, wherein
the GUI is superimposed on an image content.

18. The information processing apparatus according to claim 14, wherein
the GUI is superimposed on an image content.

19. An information processing method comprising:
recognizing whether an object in one frame of stored image content of a moving picture shot in successive frames from a camera and viewable in one viewpoint obtained from one angle of the camera is substantially the same as an object in another of the successive frames of the stored image content of the moving picture viewable in another viewpoint shot from another angle of the same camera;
notifying a user, when viewing the object viewed in the one viewpoint, that the user is able to view the object from the viewpoint in the other frame of the successive frames if the object in the one frame is substantially the same as an object in the other frame; and
causing an image reproduced from the other frame of the successive frames to be displayed when the user selects the other viewpoint for display if the user is notified that the other viewpoint is able to be viewed.

20. An information processing method comprising:
recognizing a relationship in a space in an object in one frame of stored moving picture content shot in successive frames from a camera and viewable in one viewpoint of the stored moving picture content obtained from one zoom state of the camera and a space in an object in another of the successive frames of the stored moving picture content viewable in another viewpoint shot from another zoom state of the same camera;
notifying a user, when viewing the object viewed in the one viewpoint, that the user is able to view the object from the viewpoint in the other frame of the successive frames of the stored moving picture content if the relationship in the space permits the other viewpoint to be viewed; and
causing an image reproduced from the other frame of the successive frames to be displayed when the user selects the other viewpoint for display if the user is notified that the other viewpoint is able to be viewed.

* * * * *